(12) United States Patent
Yuvaraj (10) Patent No.: US 11,430,001 B2
(45) Date of Patent: Aug. 30, 2022

(54) COMPUTATIONAL PLATFORM USING MACHINE LEARNING FOR INTEGRATING DATA SHARING PLATFORMS

(71) Applicant: PAYPAL, INC., San Jose, CA (US)

(72) Inventor: Nishanthi Yuvaraj, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/129,583

(22) Filed: Dec. 21, 2020

(65) Prior Publication Data

US 2022/0198506 A1    Jun. 23, 2022

(51) Int. Cl.
*G06Q 30/02* (2012.01)
*G06F 9/54* (2006.01)
*G06N 20/00* (2019.01)

(52) U.S. Cl.
CPC ......... *G06Q 30/0239* (2013.01); *G06F 9/547* (2013.01); *G06Q 30/0215* (2013.01); *G06N 20/00* (2019.01)

(58) Field of Classification Search
CPC   G06Q 30/0239; G06Q 30/0215; G06F 9/547; G06N 20/00
USPC ...................................................... 705/14.39
See application file for complete search history.

(56) References Cited

U.S. PATENT DOCUMENTS

2018/0174154 A1* 6/2018 Bhattacharjee ...... G06Q 30/016

FOREIGN PATENT DOCUMENTS

CN    110073301 A  *  7/2019  ............... A01B 3/02

OTHER PUBLICATIONS

Ajay Kumar Shrestha, A Blockchain Platform for User Data Sharing Ensuring User Control and Incentives, 2020 (Year: 2020).*
Giang Nguyen, Machine Learning and Deep Learning frameworks and libraries for large-scale data mining: a survey, 2019 (Year: 2019).*

* cited by examiner

*Primary Examiner* — Tarek Elchanti
(74) *Attorney, Agent, or Firm* — Haynes and Boone, LLP (57) ABSTRACT

There are provided systems and methods for a computational platform using machine learning for integration data sharing platforms. A user may engage in a transaction with another user, such as a purchase of goods, services, or other items from a merchant. A service provider may provide a data feed to the user via integrated computational platforms that allows the user to post data including information regarding the processed transaction. The post may include a share code that links back to the user and their corresponding transaction. Thereafter, the post may be viewed by other users and the share code may be used by the other users in order to perform similar transaction processing, where these later transactions are linked back to the original user. Tracking of these later transactions may be done through application extensions that allow the computational platforms to track user data over different online interactions.

20 Claims, 5 Drawing Sheets

COMPUTATIONAL PLATFORM USING MACHINE LEARNING FOR INTEGRATING DATA SHARING PLATFORMS

TECHNICAL FIELD

The present application generally relates to cross-platform application programming interface (API) integrations and more particularly to a computational platform that uses API integrations with associated data platforms to perform machine learning (ML) predictions.

BACKGROUND

Users may utilize online transaction processors for processing transactions between different entities through device applications and digital accounts. Further, these online transaction processors or other service providers may provide different data platforms that users may interact with to utilize computational services. When a user electronically processes a transaction using a transaction processor, a digital transaction history may be generated. This digital history may be stored with a digital account of the user so that the user may track their data, which may be used in big data processing and ML model training. Further, the transaction processors may also provide social networking and data posting to one or more data feeds. However, users are not incentivized to share the data, which leads to a self-contained system in which other users are unaware of useful data. For example, a peer-to-peer networking platform of the online service provider may have many data feeds and users, however, data posted on the data feeds may not be current or relevant to users. Addressing this problem involves time consuming processes when providing user input and properly navigating the interfaces and data feeds of the transaction processors platforms. Further, the different platforms of the transaction processor do not have data sharing mechanisms when not paired. Thus, the use of data from different data feeds is not optimized for artificial intelligence (AI) training, data processing, and the like.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a computational platform using machine learning for integration data sharing platforms. Systems suitable for practicing methods of the present disclosure are also provided.

A user may utilize a payment card, account, and/or digital wallet to process payments through an electronic card or transaction network associated with an online transaction processor or other service provider over a network. A digital account of the user with an online transaction processor or other service provider, such as a payment service provider (e.g., PayPal®, Venmo®, etc.), may provide electronic transaction processing services to users through one or more websites and/or applications of the online transaction processor or a merchant. Further, the service provider may provide additional services through the account on one or more platforms of the service provider, such as social networking, messaging, and/or data posting to one or more data feeds. In order to provide more comprehensive and integrated services to users, the service provider may utilize a cross-service computational platform that integrates different data processing and sharing platforms. This allows the service provider to provide a self-contained system associated the electronic transaction processing and data sharing services provided to the user by integrating these different platforms for data tracking.

In this regard, a first user may be provided an offer, which may include a discount of benefit provided to the user by a merchant and/or service provider. Transaction processing for the offer may be performed through a mobile application of the service provider, as well as payment cards, and the offer may be provided based on tracked user data from the user's online interactions (e.g., website visits, browsed information, application actions, and the like). In order to create a self-contained system where other users may view the processed transaction, the service provider may incentivize the first user to post the transaction history, offer, item, merchant and/or other transaction details to a data feed for the first user (e.g., a social networking feed, posting wall or resource, online forum, or the like). This may be done through an incentive program that rewards the first user if one or more other users view, navigate to, and/or process a transaction associated with the offer and/or purchase by the first user. A share code may be implemented with the data feed post by the first user, that may be used by the other users to receive an incentive and/or track their corresponding navigations and/or transactions. Thereafter, using the incentive program, the first user may be provided rewards or other benefits to the user account on the peer-to-peer payment and social networking network of the online service provider.

For example, a user may wish to process a purchase of one or more items in an offer extended to the user via a service provider using a digital account and/or payment card that provides values, credit, or other funds to the user through an online transaction processor and/or electronic card network. Selection of one or more items in an extended offer for an in-person transaction at a physical merchant location or via an online marketplace or other digital platform may require a payment instrument from the user for electronic transaction processing. A user may pay for one or more transactions using a digital wallet or other account with an online service provider or other transaction processor (e.g., PayPal®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions associated with offers extended to the user by the service provider. However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites, navigating and browsing application interfaces and data within applications, providing preferences or other interests (e.g., a shopping cart or wish list) with one or more service providers or merchants, interacting with other users, posting social media or other data to data feeds, and the like. In some embodiments, these interactions, actions, and user data may include a past purchase, a web browsing history, a digital shopping list, one or more account subscriptions, or a purchase benefit preference. The service provider may track the user data over a plurality of visited websites, online resources, and/or applications, for example, using an application plugin, an application extension, or an application add-on provided by a digital platform associated with the service provider and/or provided by the service provider (e.g., Honey® or another browser add-on). The service provider may therefore determine user data for a user over time and based on interactions the user performs through their computing device. The service provider may track this data through one or more application programming interface (API) integrations between different applications, microservices, decision services, and/or digital platforms of the service provider's self-contained system. The API integrations may allow for API calls and requests to be executed to track, request, and/or receive data from different platforms and operations of those platforms. The user data may include information for particular transactions processed by the user, such as a merchant name or type, transactions at particular times of day, week, month, or year, and other information associated with the user's interests and purchases. Further, the user data may include user subscriptions (e.g., to merchants or marketplaces, for media viewing or streaming, for discounts, and the like) that may be used to determine user behaviors and perspectives for purchasing.

Using user data for a first user, the service provider may determine an offer to extend to the first user for an interest of the first user, such as a specific item, item category, purchase preference, and/or merchant. An offer may include an advertisement for one or more items and/or merchants, as well as a benefit, discount, or other incentive to purchase an item (e.g., a rebate, percentage discount, free item or shipping, etc.) In this regard, the service provider may include an intelligent offer platform that implements one or more machine learning (ML) or other artificial intelligence (AI) models trained for offer determination. The AI models may be trained using input feature data from one or more users' tracked online interactions or other data. This may include supervised or unsupervised learning, which may include use of a feedback loop, annotated data, and retraining as needed based on an accuracy of the model in performing predictive decision-making for associated users to offers based on their tracked user data. Further, the service provider's platforms may include and/or be integrated with the APIs and database systems associated with one or more merchants. This may allow for requesting, pulling, and/or receiving updated and/or real-time merchant and item data so that offers may be determined, selected, and/or provided to users based on optimized data from the merchants in addition the user's data tracked from the user's online interactions. Thus, the AI model(s) may further be trained using merchant and item data for offers and/or utilize such data in automated decision-making for offers provided to users.

A digital notification or communication may then be generated for the offer in order to communicate the offer to the first user. This may include an email, text message, or other direct communication to the user. Further, using a data sharing platform, such as a social networking platform or peer-to-peer payment platform having a data feed (e.g., Venmo®), a post for the offer may be provided in a data feed associated with an account of the first user. The service provider may then track user interactions with the post, such as whether the user views the post, how often the views the post over a certain time period, how long the user views the post, navigates to a website or user interface associated with the offer (e.g., an item or merchant associated with the offer), and/or purchases one or more items associated with the offer (e.g., using the first user's account, digital wallet, or payment card). Where the offer includes an incentive, the service provider may utilize the API integrations with different internal and/or external digital platforms to determine whether the incentive has been used in a transaction. The service provider may update the user data based on the first user's interaction with the offer and may determine whether the first user processes a transaction associated with the offer.

In order to pay for a transaction associated with an offer provided to the first user via a platform of a service provider, the first user may provide the payment card or funding source information, or may login to an account with the service provider through authentication information and process the transaction using the account. A payment may then be issued to the other party to the transaction and transaction information may be stored with the digital wallet or account. In this regard, a digital token or other data may authorize and/or authenticate the user for their digital wallet use and/or a payment instrument in the digital wallet, which may be transmitted to another party (e.g., the merchant) for payment processing. Using the transaction history and an API integration with the electronic transaction processing system, the service provider may generate a further digital post that may be provided to the data feed of the first user's account to share the processed transaction, item, and/or merchant with one or more other users. The post may include information regarding the processed transaction and may include an advertisement, the initial offer and/or benefit, and/or a further offer or benefit for the other users to purchase the same or similar item from the same or similar merchant. This may be automatically done without user input so that the transaction is automatically shared with other users via a social payments platform. In other embodiments, the user may provide the post to the data feed, and the service provider may post the data through one or more APIs of the services for the data feed (e.g., the peer-to-peer payment network and social payments platform).

Thus, the post may include user information for the first user, such as account information (e.g., account name, personal name, picture or user image, address, phone number, email address, etc.), transaction information for the recent transaction (e.g., the transaction associated with the offer), and/or message information and capabilities between the users viewing the post in the data feed. Further, the service provider may generate and/or provide a tracking code having one or more alphanumeric characters, symbols, or the like, which may be used to specifically identify the user's processed transaction and corresponding post to the data feed. This "share" code may be used via API interactions with other merchant and/or marketplace transactions so that when other users use the share code in a transaction (e.g., via input as transaction data), the service provider may identify the share code in the transaction data and identify these further processed transactions as being associated with and resulting from the post to the first user's data feed. This allows for identification that the post by the first user and/or to the first user's feed provided advertisement or content that resulted in a further purchase. The share code may be linked to the same or different benefit or incentive for an item or merchant associated with the post to the first user's data feed for the processed transaction. Thus, the share code may be used to provide an incentive value back to the first user. In other embodiments, the share code may instead or further include or enable a data tracking operation, such as through an application add-on (e.g., browser extension or add-on) or through executable code, that allows for tracking the other users' interactions with the post to the first user's data feed and determination of whether that post caused a further purchase by one or more other users.

The API integrations allow for data tracking (e.g., through use of the share code and/or application/browser add-on) to provide data to the internal resource platforms of the service provider. Thus, the service provider may detect selections and use of the share code within one or more transactions, such as a later transaction processed by a second user based on the post to the first user's data feed. This later transaction may therefore be associated with the first user so that the first user may be provided some incentive, and therefore be incentivized to share their transactions via their corresponding account's data feed. In this regard, the data feed of the first user may then further be used as an advertising platform within the self-contained system and platforms of the service provider. If the second user processes a transaction, a further data feed with the same or another share code may be provided within the second user's data feed, which may cause transactions by a third, fourth, and so on user to be associated with the second user (as well as linked back to the first user in some embodiments). Additionally, the first user's data post may be updated with transactions by these other users in order to display additional purchases and further advertise the item or merchant. Further, API integrations with checkout and shopping flows may be used to populate and/or provide share codes automatically during checkout by the second user, as well as inform the second user of the first user's purchase (e.g., when the users are "friends" or link via data feeds and/or social graphs/networking). Additionally, a chat bot and corresponding API integrations with such applications may be used by the service provider's platforms in order to populate data and assist the first and/or second users with checkout requirements that may be associated with a share code and/or previously processed transaction by a known or affiliated user.

Based on one or more later processed transactions having the share code and/or resulting from the post to the first user's data feed, an amount of an incentive to provide to the first user may be determined. The incentive may correspond to a value accrued over time, such as points or other metric, which may be used to provide a reward to a user. The reward may correspond to an item, a discount, travel vouchers or points (e.g., similar to airline miles, credit card points, etc.), rebate, currency, or the like. The incentive may be accrued over time and redeemed by the first user. Further, determination of an amount and/or value of the incentive may be determined based on one or more incentive rules and/or systems, which may provide the value based on the number and/or purchase amount of the subsequent transactions linked to the first user's transaction. In some embodiments, different amounts or levels of incentives may be provided based on the second user's actions. For example, if the second user views, saves, but does not purchase an item, a lower level incentive value may be provided to the first user than if the second user purchases the item.

Once the first user has accrued incentive value in the incentive via their posts to their account's data feed, the value may be made available to the first user via their account to redeem and/or use with additional transactions. The incentive may be used for the purchase of items and services and/or use with benefits or discounts for those purchases. Further, the value may be used to achieve rankings and/or reward levels (e.g., gold member status, etc.), which may provide further incentives and services to the first user. This may include standing within a social network associated with the social payments platform and/or data fields for the service provider's integrated platforms and systems. Additionally, the value added to the first user's account may be advertised back into the first user's data feed to incentivize other users to advertise their purchases via one or more additional data feeds.

Figure 1:
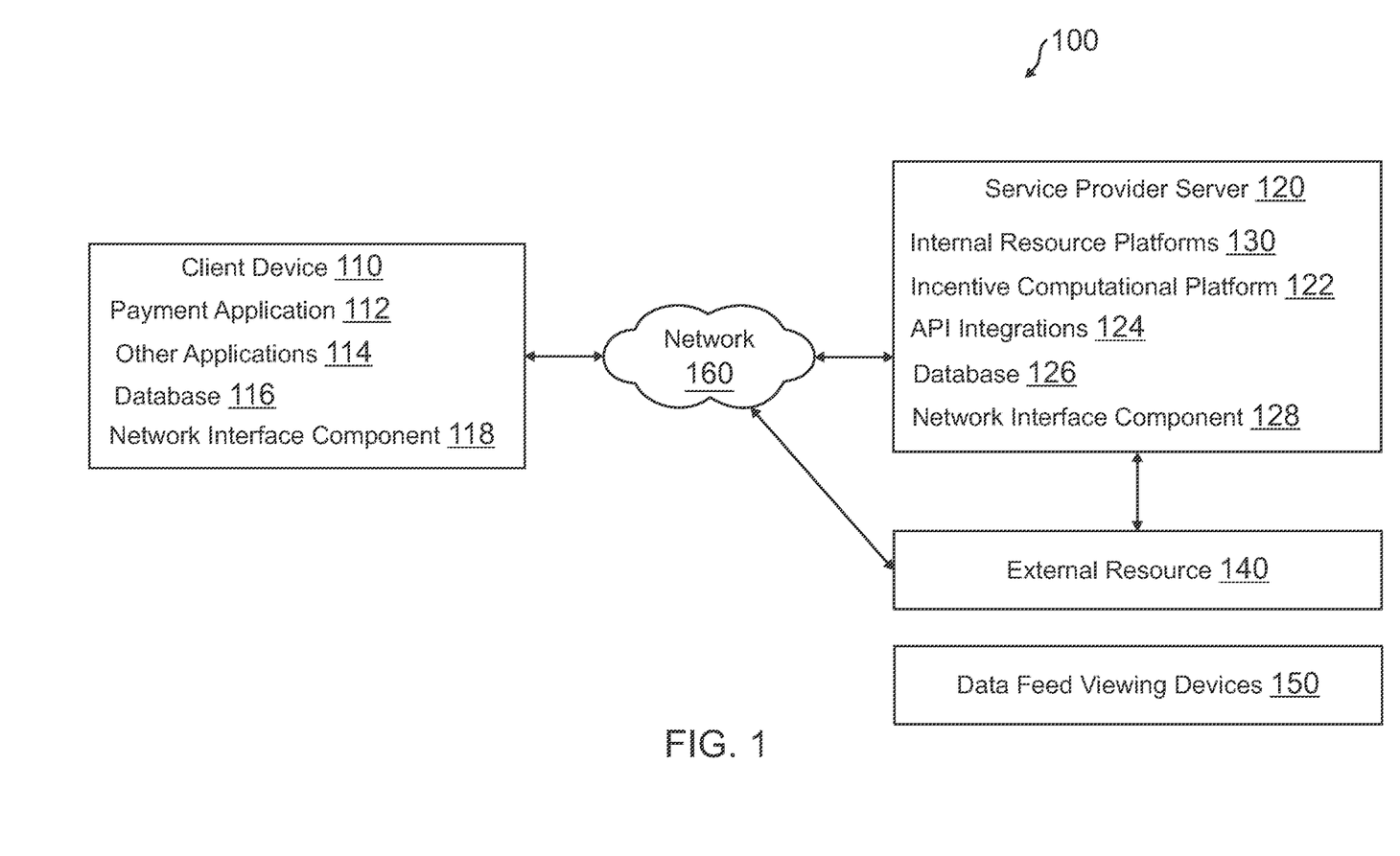
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, a service provider server 120, an external resource 140, and data feed viewing devices 150 in communication over a network 160. Client device 110 may be used to process payments, such as through social payments platform, which may be facilitated through digital accounts and processing operations of service provider server 120. Client device 110 may post to a data feed regarding a payment and transaction for one or more items, which may be provided through platforms of service provider server 120. Service provider server 120 may provide a share code through the post, and may utilize external resource 140 to provide offers based on the post and/or data tracked from client device 110. Other users may view the post via data feed viewing devices, and may further process transactions using the share code, which provides incentives to an account used by client device 110.

Client device 110, service provider server 120, external resource 140, and data feed viewing devices 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Client device 110 may be implemented using any appropriate hardware and software configured for wired and/or wireless communication with service provider server 120, external resource 140, and/or data feed viewing devices 150 for processing payments and transactions. Client device 110 may correspond to an individual user, consumer, or merchant that utilizes a peer-to-peer payment network and platform provided by transaction processor 130 to process those payments. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Client device 110 of FIG. 1 contains a payment application 112, other applications 114, a database 116, and a network interface component 118. Payment application 112 and other applications 114 may correspond to executable processes, procedures, and/or applications with associated hardware. In other embodiments, client device 110 may include additional or different software as required.

Payment application 112 may correspond to one or more processes to execute modules and associated devices of client device 110 to provide a convenient interface to permit a user for client device 110 to enter, view, and/or process items the user wishes to purchase in a transaction, as well as perform peer-to-peer payments and transfers on a social payment platform provided by service provider server 120. In this regard, payment application 112 may correspond to specialized hardware and/or software utilized by client device 110 that may provide transaction processing for the items, such as through a user interface enabling the user to enter and/or view the items that the user associated with client device 110 wishes to purchase. This may be based on an offer provided to payment application 112 by service provider server 120, for example, based on user data tracked over a period of time including user interactions performed with online resources and platforms via client device 110. Payment application 112 may also be used by the first user to provide payments and transfers to a second user or merchant. For example, payment application 112 may utilize user financial information, such as credit card data, bank account data, or other funding source data, as a payment instrument when providing payment information. Additionally, payment application 112 may utilize a digital wallet associated with an account with a payment provider as the payment instrument, for example, through accessing a digital wallet or account of a user through entry of authentication credentials and/or by providing a data token that allows for processing using the account. Payment application 112 may also be used to receive a receipt or other information based on transaction processing.

In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 160, including retrieving website information, presenting the website information to the user, and/or communicating information to the website, including payment information for the transaction. However, in other embodiments, payment application 112 may include a dedicated application of service provider server 120 or other entity (e.g., a merchant), which may be configured to assist in processing transactions electronically, such as a peer-to-peer payment application associated with a peer-to-peer payment and social network platform provided by service provider server 120. Payment application 112 may include a data tracker used to track data for a user associated with client device 110 when the user interacts with different online platforms and entities including merchants and marketplaces. The data tracker may correspond to an operation of payment application 112 and/or an application or browser extension, add-on, or plug-in. This extension may include operations to track user data, as well as offer discounts and other incentives during a payment and checkout processing flow.

In this regard, payment application 112 may further interface with the social payments platform to provide social networking and/or transaction posts to the digital platform. This may include posts that have information about an offer and/or processed transaction with a share code that enables data feed viewing devices 150 to view the transaction and process similar transactions that provide incentives back to the account and/or user associated with client device 110. Payment application 112 may be used to view notifications and/or posts on the social payments platform, which may include offers provided to the user associated with client device 110 based on user data for the user. Thus, payment application 112 may be used to perform social interactions through a platform provided by service provider server 120.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may also include other location detection applications, which may be used to determine a location for client device 110, such as a mapping application. Other applications 114 may be used to track additional data for a user associated with client device 110, which may be used to provide offers to the user. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of client device 110, such as display components capable of displaying information to users and other output components, including speakers.

Client device 110 may further include database 116 which may include, for example, identifiers such as operating system registry entries, cookies associated with payment application 112 and/or other applications 114, identifiers associated with hardware of client device 110, or other appropriate identifiers. Identifiers in database 116 may be used by a payment/service provider to associate client device 110 with a particular account maintained by the payment/service provider. Database 116 may also further store received transaction data, as well as processed transaction data. In various embodiments, user data that may be used by service provider server 120 to provide offers may be stored by database 116.

Client device 110 includes at least one network interface component 118 adapted to communicate with service provider server 120, external resource 140, and/or data feed viewing devices 150 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 of FIG. 1 includes internal resource platforms 130, an incentive computational platform 122, API integrations 124, a database 126, and a network interface component 128. Internal resource platforms 130, incentive computational platform 122, and API integrations 124 may correspond to executable processes, procedures, and/or applications with associated hardware. In other embodiments, service provider server 120 may include additional or different modules having specialized hardware and/or software as required.

Internal resource platforms 130 may correspond to one or more processes to execute modules and associated specialized hardware of service provider server 120 to provide platforms that users may interact with to receive data, post data to data feeds, and/or otherwise interact with different services provided by service provider server 120. In this regard, internal resource platforms 130 may correspond to specialized hardware and/or software used by a user associated with client device 110 to establish an account with internal resource platforms 130 by providing personal and/or financial information to service provider server 120 and selecting authentication credentials. In various embodiments, the financial information may include payment instrument information, such as account/card numbers and information. The account may be used to purchase items and/or transfer funds, for example, through a social payment platform that allows for a peer-to-peer network and/or social networking environment to process transactions between different users, merchants, or other entities. The payment account may be accessed and/or used through a browser application and/or dedicated payment application executed by client device 110, such as payment application 112. However, in other embodiments, a payment account may be generated by another online transaction processor or service provider and linked with service provider server 120. Additionally, internal resource platforms 130 may be used to create, establish, and/or post to a social networking data feed or other platform, which may include social posts associated with one or more processed transactions.

Internal resource platforms 130 may correspond to a product of service provider server 120 that may be utilized by end users, such as to perform electronic payments, transfers, and the like using one or more accounts and/or financial instruments. Internal resource platforms 130 may also include or utilize different processors, engines, or models as required for an authentication, account setup and maintenance, electronic transaction processing, deposit and/or withdrawal, dispute resolution, and the like, for example, through one or more platforms that may be integrated through different API integrations of API integrations 124 to allow APIs of the platforms, services, and applications to exchange data. Internal resource platforms 130 may include one or more APIs utilized to communicate with client device 110 and/or the different platforms of service provider server to allow for users to interact with and use the platforms of internal resource platforms 130. In various embodiments, internal resource platforms 130 may include a data tracking platform, one or more offer platforms or application tools, one or more merchant or marketplace platforms, a messaging or chat platform or bot, a social networking or social payments platform and data feed, and the like. In this regard, internal resource platforms 130 may be used to provide a data feed to client device 110 where posts may be provided through the data feed for transactions having a share code that may be viewed and used by data feed viewing devices 150. Internal resource platforms 130 may also interact with one or more external platforms of external resources 140 through API integrations 124 that provide for exchanging of data between the platforms through API calls and requests for data.

Incentive computational platform 122 may correspond to a platform having one or more applications and/or operations used for determining incentives and offers, which are provided to client device 110 and/or data feed viewing devices 150 to provide offers to users based on user data that may be generated and/or tracked via client device 110 and/or internal resource platforms 130. Incentive computational platform 122 may correspond to one or more processes to execute modules and associated specialized hardware of service provider server 120 to provide a platform for first determination of an offer, that may be communicated to client device 110 via a messaging and/or data feed of internal resource platforms 130. In this regard, internal resource platforms 130 may correspond to specialized hardware and/or software to process user data for a user associated with client device 110 using an AI or ML model and engine that performs predictive decision-making in order to determine which offers are extended to the user based on the user's predicted interest. This may also include processing merchant and/or marketplace data for the corresponding merchants or items with the user's interest in order to predict an offer of interest to a user (e.g., based on an item or merchant in the offer, as well as an incentive or discount in the offer, time of the day/week/month/year of the offer, location of the offer, and the like).

For example, an AI or ML model for offer predictive services may be generated based on training data having features extracted from user data, preferences or interests of the user, past processed transactions, offer responses by users, incentives, item and/or merchant information, and the like. When building an AI model to predict offers of interests to one or more users, the training data may be used to generate one or more classifiers and provide recommendation, predictions, or other outputs based on those classifications and the AI model. For example, an AI model may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train the AI model.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the AI that attempt to predict offers of interest to a user. Thus, when the AI model is used to perform a predictive analysis and output corresponding to one or more offers of interest, the input may provide a corresponding output based on the classifications trained using the AI model and corresponding training features.

Thus, an AI model of incentive computational platform 122 may be trained by using training data corresponding to the user, item, merchant, and/or incentive data. By providing training data to train the AI model, the nodes in the hidden layer may be trained (adjusted) such that an optimal output (e.g., a classification) is produced in the output layer based on the training data. By continuously providing different sets of training data and penalizing the AI mode when the output of the AI model is incorrect (e.g., the offer/incentive is not shared, viewed, and/or redeemed within acceptable thresholds), the AI model of incentive computational platform 122 (and specifically, the representations of the nodes in the hidden layer) may be trained (adjusted) to improve its performance in data classification. Adjusting the layers may include adjusting the weights associated with each node in the hidden layer. Further, where the user later onboards with service provider server 120 to receive offers, the AI model may be trained by retrofitting the models based on the currently trained model, inputs, and classifications.

Once an AI model has been trained and/or generated for offer prediction, incentive computational platform 122 may use the AI model to take as input some user data that may be tracked and/or received for a user associated with client device 110 with merchant and/or item data for available offers, items/services, and purchases, and provide as output an offer that may be of interest to the user. The offer may be provided to the user via a data feed and/or through an electronic communication (e.g., a message, text, or email). The user may interact with the offer, which may be used to revise the training for the AI model and continuously train the AI model as necessary by the training algorithm (e.g., a continuously learning neural network (NN)). If the user processes a transaction, incentive computational platform 122 may automatically generate a post for the transaction to a data feed of the user's account that may be viewed by data feed viewing devices 150, where other users may use the post and/or a share code in the post to process further transactions. This may correspond to transactions resulting from the post (e.g., where the post acts as an advertisement).

However, in other embodiments, the user may generate and/or provide the post based on the transaction to a data feed. The post may include a share code, which may be used to specifically identify the transaction and corresponding account for the user associated with client device 110. As other users view the post and/or interact with a corresponding offer or incentive for the post using the share code, incentives may be accrued for the user's account. For example, incentive computational platform 122 may provide incentives to the user's account based on transaction processed using the share code by other users associated with data feed viewing devices 150. The incentives may include points, benefits, and the like that may be used and/or redeemed for additional transaction processing and/or receipt of items or services by the user. Thus, the user may be incentivized to provide the post and share code and advertise the user's purchase to other users via the post through incentives provided by incentive computational platform 122.

Additionally, service provider server 120 includes database 126. Database 126 may store various identifiers associated with client device 110. Database 126 may also store account data, including payment instruments and authentication credentials, as well as transaction processing histories and data for processed transactions. Database 126 may store received data associated with a user for use in determining offers presented to the user. This may include offers provided to users, processed transactions from the offers, and social payment or networking posts with share codes for the transactions. Further, incentives accrued from data posts and uses of share codes to advertise and purchase items for various accounts may be stored by database 126 for later use in allocating incentives and receiving benefits or rewards from the incentives.

In various embodiments, service provider server 120 includes at least one network interface component 128 adapted to communicate client device 110, external resource 140, data feed viewing devices 150, and/or another device/server for a merchant over network 160. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

External resource 140 may correspond to an external platform, server, and/or device separate from service provider server 120 that may provide some data to service provider server 120, for example, during generation of offers to provide to users and/or implementation of an incentive program. External resource 140 may provide merchant and/or item data for offers associated with items/services that may be purchased by users. In various embodiments, service provider server 120 may interface with external resource 140 via one or more APIs of services or applications of service provider server 120 and external resource 140, which allows for data exchange. This may include populating data during checkout and payment processing flows, detection of use of a share code during transaction processing, and the like. This may allow for determination of incentives to provide to users' accounts based on use of the share code in causing further transaction processing through a post to a data feed. Further, this allows for use or provision of an incentive during transaction processing that may be provided based on use of the share code.

Data feed viewing devices 150 may be implemented using any appropriate hardware and software configured for wired and/or wireless communication with client device 110, service provider server 120, and/or external resource 140 for viewing data feeds that may include social payment or networking posts having share codes. Data feed viewing devices 150 may also be used to electronic transaction processing including use of share codes during transaction processing. Client device 110 may correspond to an individual user, consumer, or merchant that utilizes a peer-to-peer payment network and platform provided by transaction processor 130 to process those payments. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
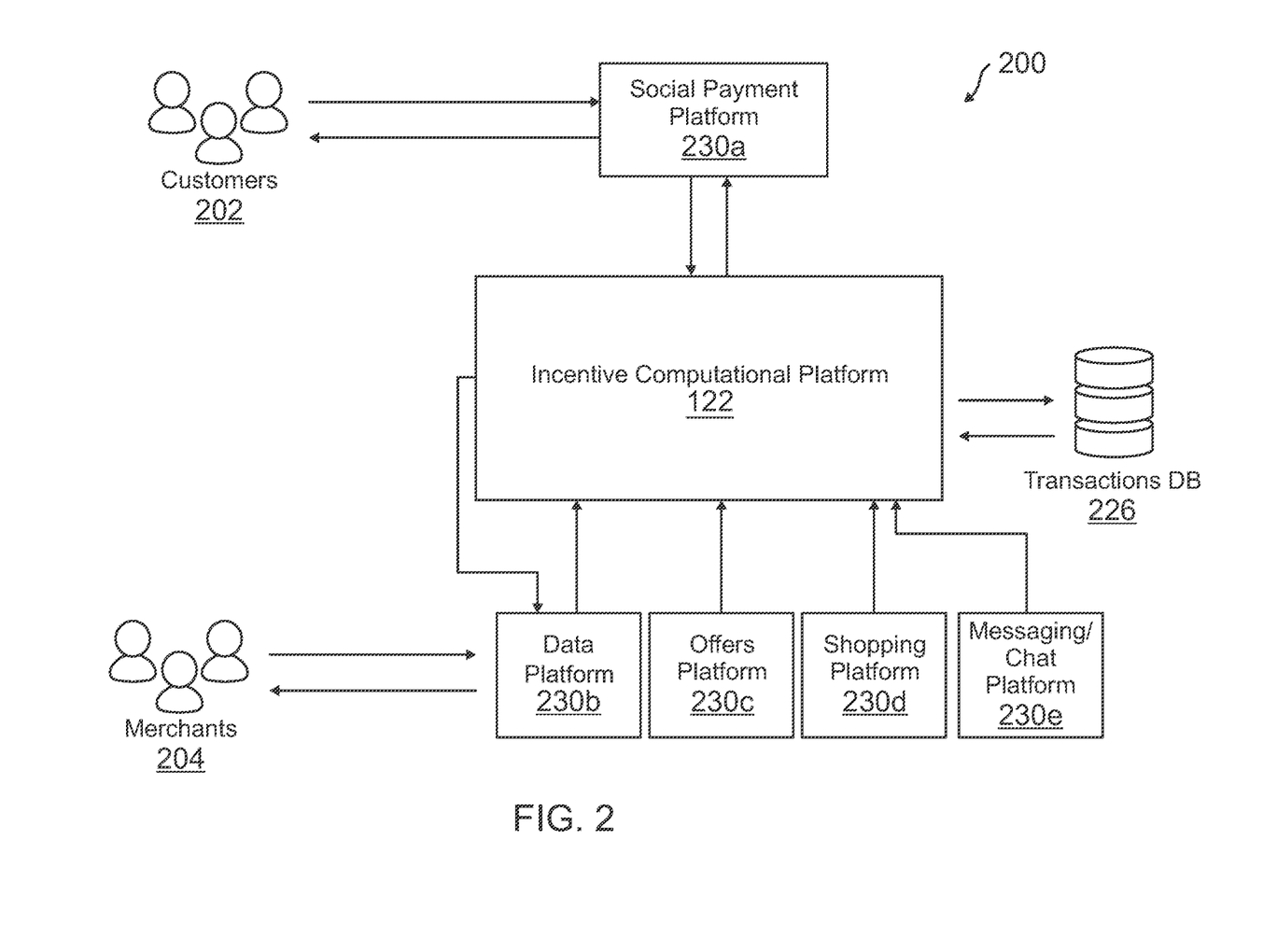
FIG. 2 is exemplary system environment used to provide a computational platform that integrates different data sharing platforms for data processing, according to an embodiment.

FIG. 2 is exemplary system environment 200 used to provide a computational platform that integrates different data sharing platforms for data processing, according to an embodiment. System environment 200 includes customers 202 that may interact with the platforms and computing systems of system environment 200, such as through client device 110 discussed in reference to system 100 of FIG. 1. System environment 200 may correspond to a self-contained system for providing electronic transaction processing, offers, and incentives through different integrated platforms to exchange data via incentive computational platform 122 from system 100. Inventive computational platform 122 may be provided by service provider server 120 from system 100, where the integrated platforms may correspond to internal resource platforms 130 of service provider server 120.

In system environment 200, customers 202 may interact with a social payment platform 230*a*, which may correspond to one or more applications and services that allow users to process payments to other users and merchants, as well as post data regarding those payments through one or more data posts to a social networking data feed. The data feed may allow for other users to view a digital wall of an application and review these social networking posts regarding processed transactions. Further, the data feed or other account notification and communications for a user's account with social payment platform 230*a* may be used to provide offers to users. One or more offers or posts within the data feed may include a share code used to track other users purchases and provide incentives to the user that posted the share code to their data feed.

Incentive computational platform 122 may therefore integrate the platforms shown in system environment 200, for example, through interfacing with those platforms, applications, and services using one or more APIs and API integrations between platforms. For example, incentive computational platform 122 may interface with social payment platform 230*a* through one or more APIs used to exchange data through API calls and requests, which may allow for posting of data to a data feed and monitoring interactions by users with data feeds and posts. In order to post data to data feeds and track interactions with the posted data (e.g., for a transaction), incentive computational platform 122 may first determine an offer and provide the offer to a first user. This may be done through retrieving user data, such as past processed transactions (including corresponding merchants, times of the transactions, patterns, and the like), user interests or preferences, and other online interactions with different platforms. Over time, the data may be generated based on interactions by customers 202 with social payment platform 230*a*, a data platform 230*b*, an offers platform 230*c*, a shopping platform 230*d*, and/or a messaging/chat platform 230*e*. The user data may be stored in transactions database 226.

When determining an offer, data platform 230*b* may also determine, track, and/or retrieve data from merchants 204, which may include available items, prices, and/or benefits that may be applied to transactions for the items. This allows for updated or real-time data processing for offer determination so that price points and pricing may be provided when of interest to a user for one or more items. Data platform 230*b* may correspond to a platform that further provides an integration with merchants and/or marketplaces to allow for application of benefits during electronic transaction processing and payment processing flows during checkout and payment. In further embodiments, data platform 230*b* may also provide an application or browser add-on to a browser application or dedicated resident application on devices for customers 202. Data used to determine an offer for a user may be processed using a ML model trained for offer predictive services. Thus, data for a transaction history and existing offers or deals determined from data platform 230*b* may be processed by this trained ML model.

Incentive computational platform 122 may further interface with offers platform 230*c* where one or more offers for items may be provided to customers 202 through different communication channels and/or mediums. In some embodiments, offers platform 230*c* may further output offers via social payment platform 230*a* through interfacing with an API for a data feed and/or social networking service of social payment platform 230*a*. Shopping platform 230*d* may be used to read data from inventive computational platform 122 and provide data during checkout and/or payment, such as through an affiliated merchant or marketplace checkout flow when a user is shopping. In order to further output offers, as well as other data (e.g., share codes), incentive computation platform 122 may also push data to users (e.g., offers and share codes) via a chat bot or other chat platform for messaging/chat platform 230*e*, which may be used to attempt to convert intents for purchases to valid and processed purchases. These interactions may be facilitated through API integrations of incentive computational platform 122 with social payment platform 230*a*, data platform 230*b*, offers platform 230*c*, shopping platform 230*d*, and/or messaging/chat platform 230*e*.

Thereafter, when a transaction is processed, incentive computation platform 122 may further generate and/or provide a post associated with the transaction to a data feed for a first user's account (e.g., one of customers 202) that processed the transaction via social payment platform 230a. This may also include providing share codes for processed transactions via transaction posts to the data feed, which may be used by other users to receive an incentive or benefit. This share code may therefore link further transactions back to this first user that provides a post for the transaction. Where further transactions are processed, incentive computational platform 122 may then determine an amount, value, or share of an incentive that may be accrued back to the first user's account. Incentive computational platform 122 may provide an incentive program to incentivize users to share these posts through data feeds, which provides advertisement of the corresponding item or merchant. Thus, using the incentive program, the user may receive points, rewards, or other benefits that allow for redemption of rewards or discounts available via the first user's account. Use of the share codes may be tracked by data platform 230b, such as by detecting use of the share codes with merchants 204. Moreover, the share codes may also be output to users during electronic transaction processing with merchants 204 using shopping platform 230d and/or messaging/chat platform 230e.

Figure 3A:
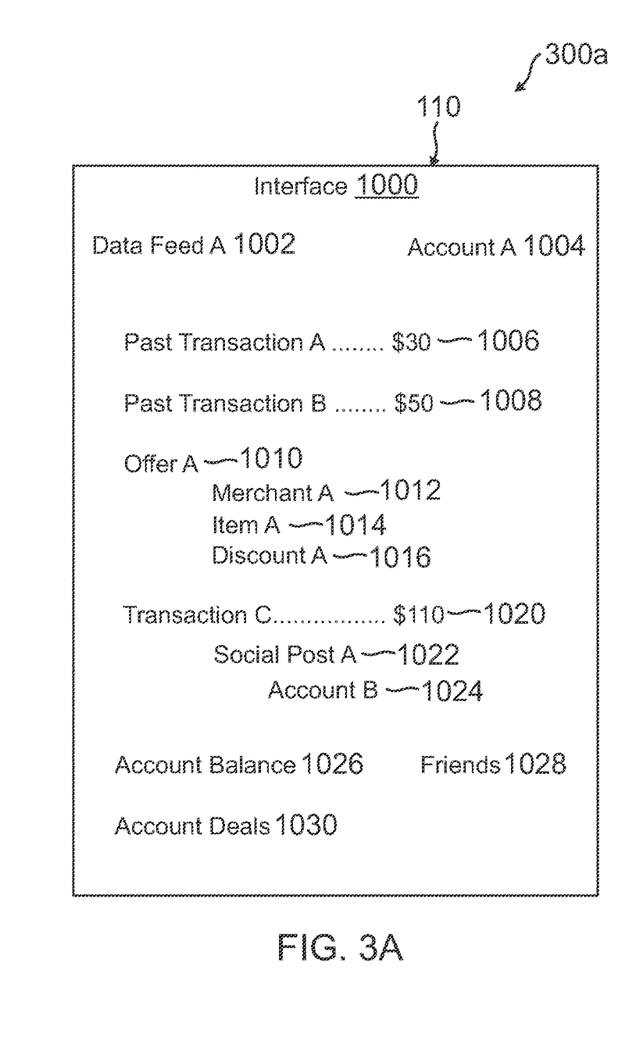
FIG. 3A is an exemplary display interface of a first data feed on a transaction processor platform that displays an offer to a user based on shared data used to train an ML model, according to an embodiment.

FIG. 3A is an exemplary display interface 300a of a first data feed on a transaction processor platform that displays an offer to a user based on shared data used to train a ML model, according to an embodiment. User interface 300a of FIG. 3A may be displayed by client device 110 discussed in reference to system 100 of FIG. 1. In this regard, client device 110 includes display interface 300a that includes an interface 1000 of an application that may access a data feed of a social networking and/or payments platform for an account of a user associated with client device 110.

Interface 1000 on client device 110 displays a data feed A 1002 where a user may view an offer extended to the user that is determined using an AI or ML model trained for offer predictions based on user, merchant, and/or item data. Data feed A 1002 may be associated with an account A 1004 for the user corresponding to client device 110, which may correspond to a social payment account that allows for electronic transaction processing and posting to data feed A 1002. This may allow for both digital payments and social networking. In this regard, data feed A 1002 includes a past transaction A 1006 and a past transaction B 1008. Past transaction A 1006 and a past transaction B 1008 may include data posted to data feed A 1002 resulting from a transaction and payment made via account A 1004. Further, past transaction A 1006 and a past transaction B 1008 may include user data that is processed in order to determine offers. Other users may also view past transaction A 1006 and a past transaction B 1008, or such data may be hidden and only viewable by the user of account A 1004.

For example, based on tracked user data including user interactions, preferences, past transaction A 1006, past transaction B 1008, and the like, an offer A 1010 may be determined using an AI or ML model of incentive computational platform 122 from system 100. Offer A 1010 is shown with offer details including a merchant A 1012, an item A 1014, and a discount A 1016. Using offer A 1010, the user may utilize client device 110 and account A 1004 to process a transaction for offer A 1010. The transaction processing with offer A 1010 may be tracked using an application or browser add-on or through tracking the user's navigations to and use of transaction processing associated with offer A 1010. In some embodiments, the transaction processed for offer A 1010 may further be displayed in data feed A 1002, which may include a share code that may be used in further transaction processing by other users to provide an incentive back to account A 1004 for the corresponding user. This may be done through incentive computational platform 122 that determines an amount or value of an incentive to provide back to account A 1004 for use of the share code during transaction processing. In some embodiments, the share code may further provide discount A 1016 or another benefit to the other users during transaction processing.

Further, data feed A 1002 includes a transaction C 1020, which provides data for the corresponding transaction from another user that may be shared in data feed A 1002 so that a user corresponding to account A 1004 may view the transaction processed by other users and accounts. Additionally, transaction C 1020 is shown with a social post A 1022 by a user associated with account B 1024, such as a social networking comment, emojis or other graphical images, and/or information regarding transaction C 1020. This allows the user viewing data feed A 1002 to view and interact with the user corresponding to account B 1024. Additionally, interface 1000 includes an account balance 1026 and friends 1028 (e.g., associated accounts where social payment posts may be viewed in data feed A 1002), which may provide data regarding account A 1004. As account A 1004 accrues incentive values based on shared posts and share codes for processed transactions, account deals 1030 may provide information and/or a link to incentives, rewards, benefits, and the like resulting from the accrued incentive value.

Figure 3B:
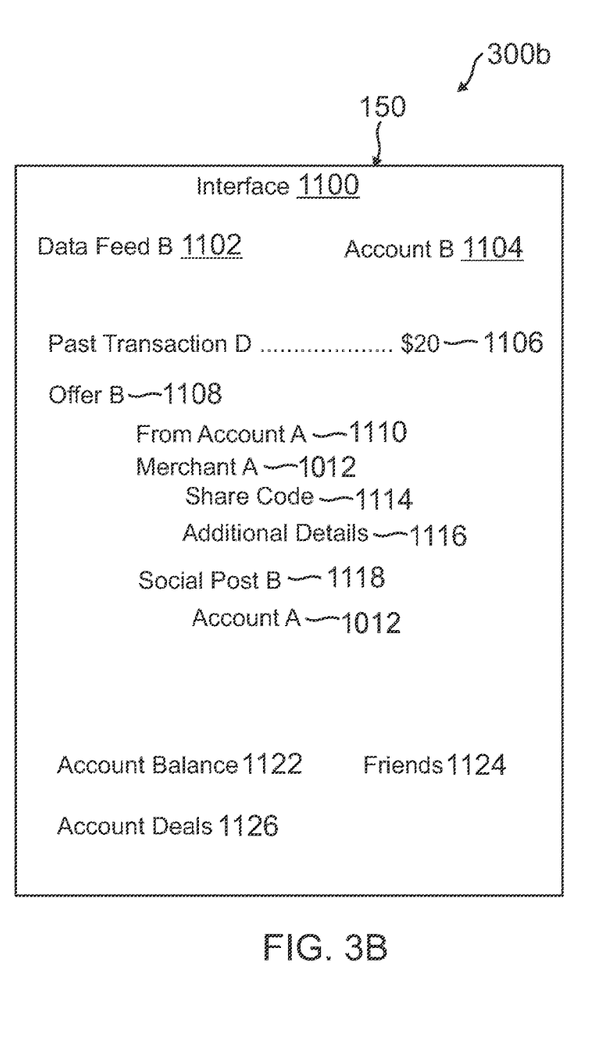
FIG. 3B is an exemplary display interface of second data feed on a transaction processor platform that displays a share code based on shared transaction histories on the transaction processor platform, according to an embodiment.

FIG. 3B is an exemplary display interface 300b of a second data feed on a transaction processor platform that displays a share code based on shared transaction histories on the transaction processor platform, according to an embodiment. Display interface 300b of FIG. 3B may be displayed by one or more of data feed viewing devices 150 discussed in reference to system 100 of FIG. 1. In this regard, a device of data feed viewing devices 150 includes display interface 300b that includes an interface 1100 of an application that may access a data feed of a social networking and/or payment platform for an account of a user associated with the device of data feed viewing devices 150.

In interface 1100, a data feed B 1102 may be displayed for a different account B 1104 associated with the device displaying interface 1100. Data feed B 1102 may include information for processed transactions by other users (e.g., the user associated with account A 1004 in FIG. 3A) in one or more offers or other posts that include a share code to track further transactions processed in response to viewing the offer and/or post. Further, data feed B 1102 may also include information for transactions processed by account B 1104, including a past transaction D 1106. Past transaction D 1106 may include information about a transaction history for account B 1104 within data feed B 1102 for viewing by the user associated with account B 1104 and/or other users. Further, in data feed B 1102, the offer provided to the user associated with account B 1104 may include an offer B 1108 based on a transaction processed by the user associated with account A 1004 based on offer A 1010.

For example, offer B 1108 may include account information 1110 that designates offer B 1108 is from account A 1004 from FIG. 3A. Offer B 1108 further includes information identifying merchant A 1012 similar to offer A 1010 in data feed A 1002, such as when the first user associated with account A 1004 purchases an item from merchant A 1012 and then posts data for the transaction that may be viewed in offer B 1108. In order to associate any further transaction processing with account A 1004, a share code 1114 may be provided with offer B 1108, which may also provide an incentive or other benefit to account B 1104 when used in a transaction with merchant A 1012. Additional details 1116 may include further information about offer B 1108, such as an item purchased by account A 1004. With offer B 1108, a social post B 1118 may be provided by account A 1012. Social post B 1118 may correspond to a social networking and/or social payments post (e.g., a message, content, image, etc.) by the user associated with account A 1004. Additionally, within interface 1000, an account balance 1122 and friends 1124 (e.g., associated accounts where social payment posts may be viewed in data feed B 1102), are shown, which may provide data regarding account B 1104. As account B 1104 accrues incentive values based on shared posts and share codes for processed transactions, account deals 1126 may provide information and/or a link to incentives, rewards, benefits, and the like resulting from the accrued incentive value.

Figure 4:
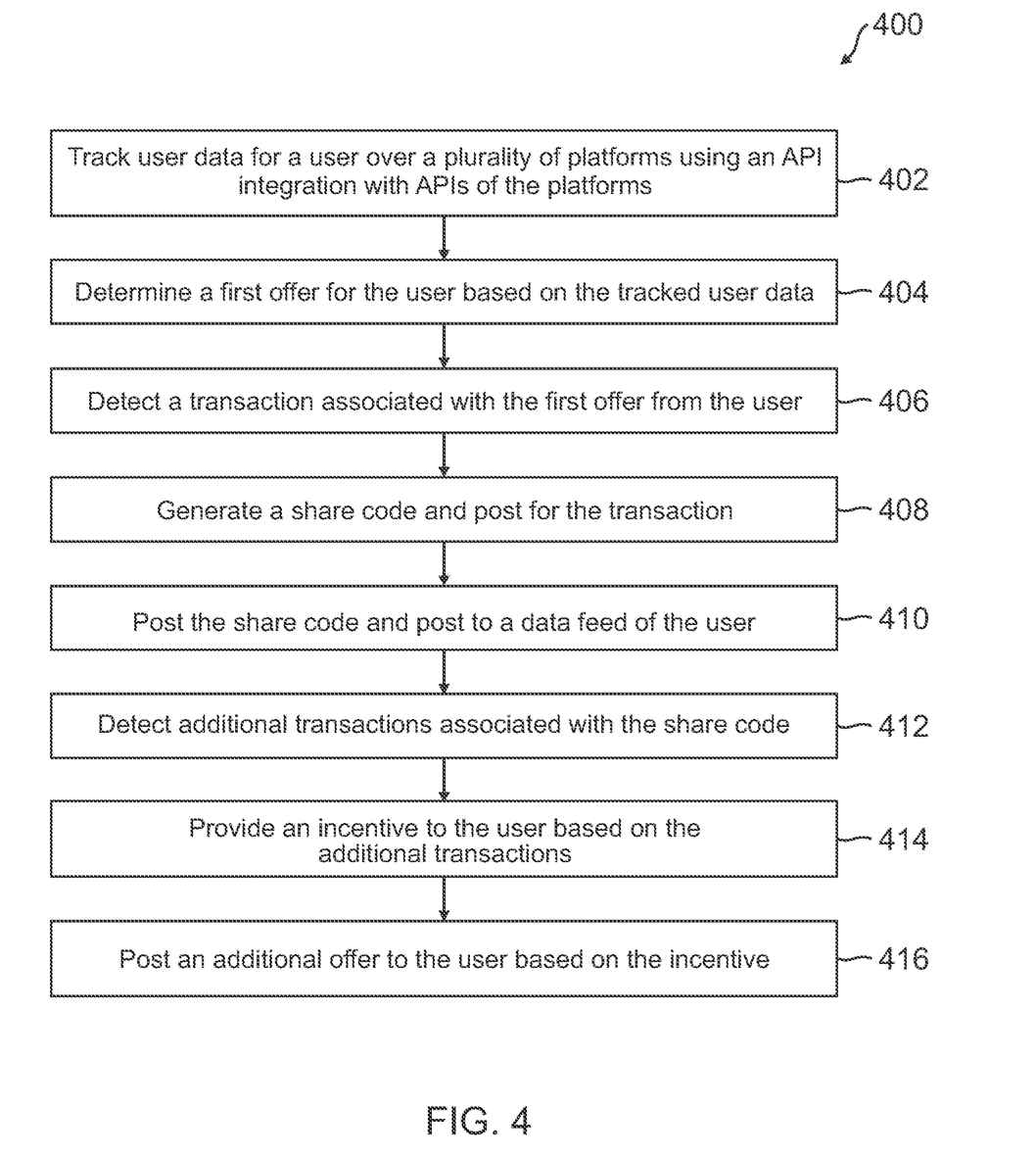
FIG. 4 is a flowchart for processes utilized by a computational platform using machine learning for integration data sharing platforms, according to an embodiment.

FIG. 4 is a flowchart 400 for processes utilized by a computational platform using machine learning for integration data sharing platforms, according to an embodiment. Note that one or more steps, processes, and methods described herein of flowchart 400 may be omitted, performed in a different sequence, or combined as desired or appropriate.

At step 402 of flowchart 400, user data for a user is tracked over a plurality of platforms using an API integration with APIs of the platforms. For example, past user purchases, a web browsing history, a digital shopping list, one or more account subscriptions, or a purchase benefit preference may be tracked over time, which may demonstrate preferences and/or habits in user purchasing. Further changes to this information, such as upgrading or downgrading a subscription, can be used to determine interest of a user over time. This may be used as training data for an AI or ML model through feature extraction in order to provide offers to the user or other users. Further, merchant, offer, and/or item information, including pricing and incentives for purchases, may be used for further training of the AI model. Tracking of the user data may be performed through one or more application or browser add-ons, such as one that may provide offers and incentives to users that may be applied by the add-on during electronic transaction processing and a checkout flow. This add-on therefore may allow for monitoring of user interactions and/or transaction processing with different websites and/or applications of merchants and/or marketplaces.

Using the trained AI model, a first offer for the user is determined based on the tracked user data, at step 404. The first offer may correspond to an advertisement or other information for an item or merchant, including any incentives or benefits that may be applied to a purchase, may be provided through the first offer. The first offer may be communicated to the user via a messaging, chat, and/or social networking/payments platform, including providing a post for the offer via a digital post to a data feed associated with an account of the user. At step 406, a transaction associated with the first offer by the user is detected. For example, the user may visit a merchant website or application interface and may select one or more items for purchase. The user may apply any incentives or benefits and may request electronic transaction processing. In various embodiments, the add-on to the dedicated or browser application may be used to apply the first offer or a corresponding incentive to the transaction processed via a device of the user.

At step 408, a share code and post for the transaction is generated. The share code may correspond to an alphanumeric identifier or other data that may be added to further transactions during checkout and/or payment flows, and may specifically identify the user, the user's account, and/or the transaction processed by the user that is posted to a social payments data feed associated with the user. The share code may further apply one or more offers or incentives to the later processed transactions, which may be the same or a different offer from the one provided to the user. The post may therefore include a social networking or other data post to the user's data feed that records the transaction information and display such information to other users. Further, the post may include the share code so that the other users may receive the benefit and/or link back to the user originally processing the transaction and providing data for the transaction to the data feed.

At step 410, the share code and post are posted to a data feed of the user. The data feed may correspond to a social networking platform that allows users, including linked user accounts or "friends," as well as global users in some embodiments. Other users may therefore view the transaction's information via a post and may further purchase an item or service in further transactions that are affiliated with the share code and data post. In various embodiments, the posts and information shared with friends or other linked accounts may be based on a "strategic" or intelligent share. This strategic share may utilize additional information to determine whether to share a post for a transaction, which may include a share code allowing for further use of benefits and/or transaction processing. The additional information may include the same or similar likes, birthdays, a common subscription, calendar events (which may be shared, linked, or otherwise interact including those that may share a same or similar time such that the other user may be able or unable to attend an event), planned vacations, and the like.

At step 412, additional transactions are detected that are associated with the share code. The share code may be entered to a field of a checkout and payment flow, which may then be received back by the transaction processor during further electronic transaction processing. Based on the additional transactions, an incentive is provided to the user, at step 414. The incentive may correspond to an amount, share, or value of an incentive that is provided to the user's account and allows to user to accrue and/or redeem for further benefits. The user may then use the incentives and values to receive items, services, account benefits, discounts, and the like. Further, the incentives may be used to determine an additional offer for the user, such as a particular benefit or item that may be obtained by the user using the incentive share. Thus, at step 416, an additional offer is posted to the user based on the incentive. This may be done through the data feed of the user's account or through another communication channel or platform. In various embodiments, a share or portion of the points and/or incentives may be shared or transferred between friends. For example, a user may wish to gift or provide another user with points/incentives. Further, a coupon or other benefits/reward accrued from points and/or incentives by a user (e.g., based on uses of share codes and/or interaction with transaction posts) may also be transferred between users, such as when exchanging benefits/rewards, gifting benefits/rewards, or the like.

Figure 5:
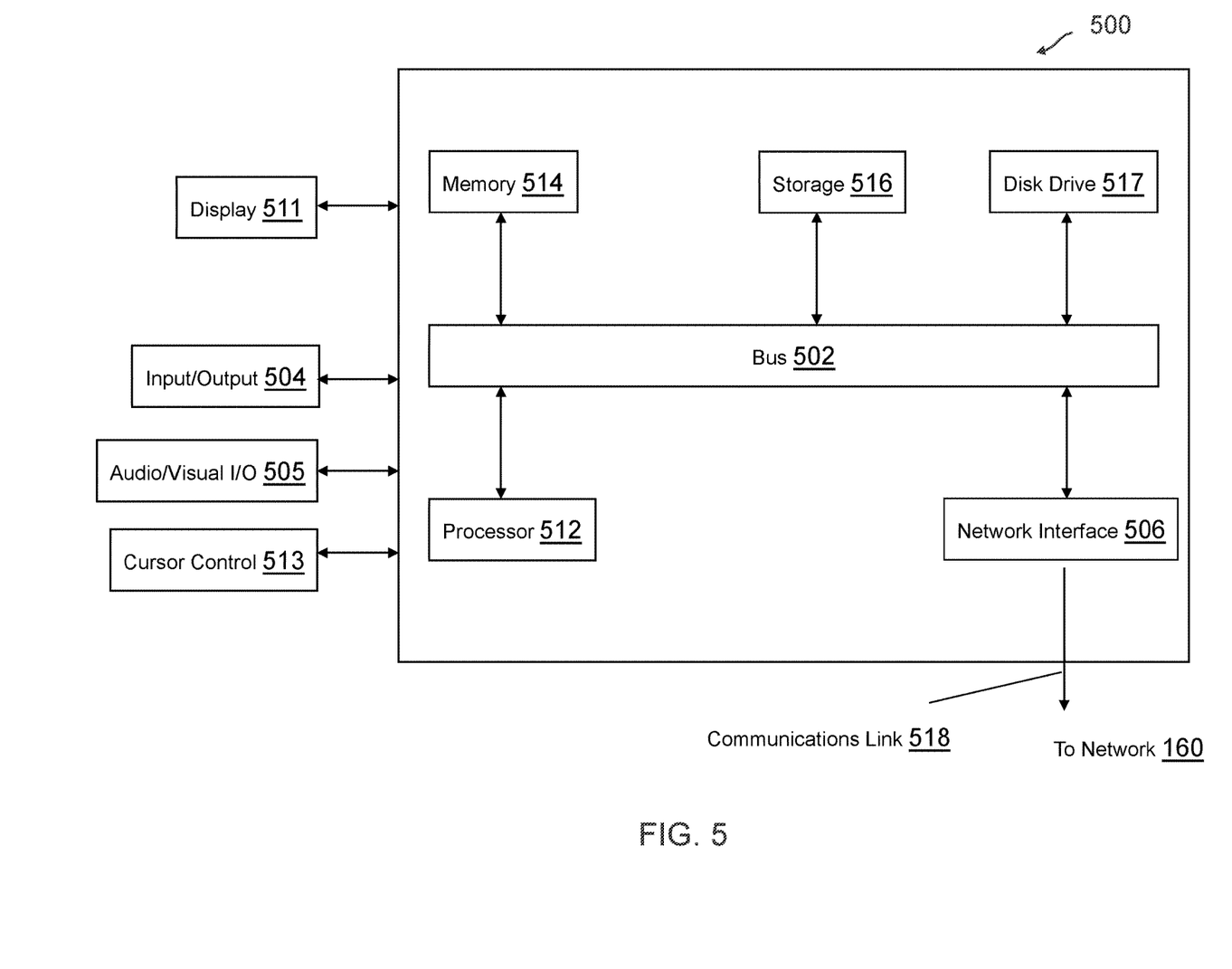
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        determining, via a first application programming interface (API) for a first digital platform, user data for a user from the first digital platform for a plurality of online merchants;
        detecting, via an electronic transaction processing platform associated with the system, a transaction processed using an account of the user via the electronic transaction processing platform with an online merchant of the plurality of online merchants, wherein the electronic transaction processing platform provides a data feed to a user device of the user through the account of the user;

generating, based on the user data and the transaction, an alphanumeric share code identifying the user to the system, wherein the alphanumeric share code is associated with at least one of the online merchant or an item associated with the transaction;

posting the alphanumeric share code to the data feed associated with the account, wherein the data feed exposes at least the alphanumeric share code to a plurality of accounts of the electronic transaction processing platform;

tracking a plurality of interactions by a plurality of users with the data feed that are associated with the alphanumeric share code;

executing, via at least the first API, API calls for data requests from a plurality of service providers using a plurality of API integrations with the plurality of service providers;

determining, based on the API calls, user activities by the plurality of users with the plurality of service providers using the alphanumeric share code;

performing, using a computational platform comprising a multi-layer machine learning (ML) model, a predictive decision-making for an output classification of a first benefit for the user based on the user data of the user, the plurality of interactions by the plurality of users, and the user activities by the plurality of users, wherein the multi-layer ML model comprises an input layer, at least one hidden layer, and an output layer each having one or more nodes trained for user interest prediction using training data for the output classification at the output layer;

determining, from the computational platform, the first benefit to provide to the user based on the predictive decision-making;

providing the first benefit to the user in association with the data feed and the user activities; and posting, to the account of the user, an additional offer associated with the first benefit and additional transactions that utilized the alphanumeric share code.

2. The system of claim 1, wherein the determining the user data is via an API integration of the plurality of API integrations for a second API of the electronic transaction processing platform with the first API of the first digital platform.

3. The system of claim 1, wherein the first API is associated with one of an application plugin, an application extension, or an application add-on provided by the first digital platform, and wherein the user data comprises tracked user interactions over at least one of a plurality of visited webpages or a plurality of dedicated mobile applications associated with the plurality of online merchants.

4. The system of claim 3, wherein the tracked user interactions comprise at least one of a past purchase, a web browsing history, a digital shopping list, one or more account subscriptions, or a purchase benefit preference.

5. The system of claim 1, wherein the operations further comprise:

determining the additional transactions processed using the alphanumeric share code via at least one of the first digital platform or the electronic transaction processing platform;

determining a second benefit to provide to the account based on the additional transactions processed using the alphanumeric share code, wherein the second benefit comprises a value available for use by the account; and providing the second benefit to the account.

6. The system of claim 5, wherein the operations further comprise:

detecting an access of the account via the electronic transaction processing platform;

determining an incentive offer for the user based on at least one of the first benefit or the second benefit; and providing the incentive offer to the user via one of the account or the data feed associated with the account.

7. The system of claim 5, wherein the operations further comprise:

receiving a request for an incentive offer from the user based on at least one of the first benefit or the second benefit provided to the account; and generating the incentive offer for the user based on the at least one of the first benefit or the second benefit.

8. The system of claim 5, wherein the operations further comprise:

integrating with a second API for a second digital platform associated with a shopping marketplace for a use of at least one of the first benefit or the second benefit during a data processing flow for a transaction checkout via the shopping marketplace.

9. The system of claim 5, wherein the operations further comprise:

integrating with a second API for a second digital platform associated with an automated chatbot for a communication of one or more incentive offers associated with at least one of the first benefit or the second benefit via the automated chatbot during a data browsing session.

10. The system of claim 5, wherein at least one of the first benefit or the second benefit is based on at least one of a percentage of the additional transactions, a number of the additional transactions, a fixed amount for each of the additional transactions, or a progressive amount for tiered numbers of the additional transactions.

11. The system of claim 1, wherein prior to the detecting the transaction and the generating the alphanumeric share code, the operations further comprise:

determining an offer for the item associated with the transaction based on the user data, wherein the user data comprises a past purchase history of the user and a subscription history of the user; and communicating the offer to the user via one of the account or the data feed.

12. The system of claim 11, wherein the alphanumeric share code comprises an incentive associated with the offer and used by the user in the transaction.

13. A method comprising:

generating, by an online transaction processor, an identifier for a purchase processed by a user to a merchant using a digital account of the user with the online transaction processor, wherein the digital account is associated with a data feed for a social payments platform of the online transaction processor;

receiving a social payment post for the purchase from the data feed for the digital account;

posting the identifier with the social payment post;

tracking, via an application programming interface (API) integration with an API for a browser plugin of a data tracking platform, a plurality of interactions by a plurality of accounts with the social payment post, wherein the tracking is performed via respective computing devices of the plurality of accounts having a browser application using the browser plugin, wherein the tracking comprises executing API calls for data requests via the API integration with the data tracking platform;

determining, using the API integration with the API for the browser plugin, a plurality of uses of the identifier by the plurality of accounts via the online transaction processor;

performing, using a computational platform comprising a multi-layer machine learning (ML) model, a predictive decision-making for an output classification of an incentive for the user based on the digital account of the user, the plurality of interactions by the plurality of accounts, and the plurality of uses by the plurality of accounts, wherein the multi-layer ML model comprises an input layer, at least one hidden layer, and an output layer each having one or more nodes trained for user interest prediction using training data for the output classification at the output layer;

generating, from the computational platform, an incentive for the user based on the predictive decision-making;

providing the incentive to the account through the data feed of the social payments platform in association with the social payment post; and posting, to the account of the user, an additional offer associated with the incentive.

14. The method of claim 13, wherein prior to the generating the identifier, the method further comprises:

receiving a transaction for the purchase processed by the user using the digital account, and wherein the generating the identifier is performed in response to receiving the transaction.

15. The method of claim 14, wherein prior to the receiving the transaction, the method further comprises:

collecting, via the API integration with the API for the browser plugin of the data tracking platform, tracked user interactions with a plurality of websites data;

generating an offer for one of the merchant or an item in the purchase based on the tracked user interactions; and providing the offer to the digital account for a use with the transaction by the user, and wherein the transaction uses the offer for the purchase.

16. The method of claim 13, wherein the identifier further comprises at least one of a benefit or a discount for one of the merchant or an item associated with the purchase from the merchant, and wherein prior to the generating the identifier, the method further comprises:

determining merchant sales data associated with the one of the merchant or the item, wherein the identifier is further generated based on the merchant sales data.

17. The method of claim 13, wherein the API integration enables tracking by the online transaction processor of digital interactions across a plurality of websites using the browser plugin.

18. The method of claim 13, further comprising:

exposing data associated with at least one of the purchase, the plurality of uses of the identifier, or the incentive to a plurality of online merchant platforms via an API of the social payments platform.

19. A non-transitory machine-readable medium having stored thereon machine-readable instructions executable to cause a machine to perform operations comprising:

determining, via an application programming interface (API) for a browser extension of a data tracking platform, user data for a user from a plurality of websites for a plurality of online merchants;

generating an offer to the user for a product associated with the user data from an online merchant of the plurality of online merchants;

receiving transaction data for a transaction for the product based on the offer processed using a digital account of the user with an online transaction processor;

generating a code identifier for the product that identifies the product purchased by the user with the online merchant;

sharing, through an online data feed for the digital account, the code identifier via a data post with at least a portion of the transaction data;

tracking a plurality of interactions with the data post that is associated with the code identifier, wherein the tracking comprises executing API calls using the browser extension for data requests from the online data feed for the plurality of interactions, wherein the browser extension is associated with a plurality of computing devices of a plurality of users;

determining, based on the API calls using the API of the browser extension, user activities by the plurality of users using the code identifier;

performing, using a computational platform comprising a multi-layer machine learning (ML) model, a predictive decision-making for an output classification of a digital account value for the user based on the user data of the user, the plurality of interactions by the plurality of users, and the user activities by the plurality of users, wherein the multi-layer ML model comprises an input layer, at least one hidden layer, and an output layer each having one or more nodes trained for user interest prediction using training data for the output classification at the output layer;

determining, from the computational platform, the digital account value based on the predictive decision-making;

providing the digital account value to the user in association with the user activities; and posting, to the digital account of the user, an additional offer associated with the digital account value.

20. The non-transitory machine-readable medium of claim 19, wherein the operations further comprise:

accruing an incentive value for the user over a time period based at least on the digital account value;

generating a further offer to the user from the incentive value; and providing the further offer to the user via one of a post to the online data feed or a message to the digital account after the time period.

\* \* \* \* \*